Dec. 13, 1960

B. FUENTE 2,964,058

HYDRAULIC VALVE WITH CONTROLLED BYPASS
TO REDUCE OPERATIONAL SENSITIVITY

Filed March 21, 1957

INVENTOR.
BENJAMIN FUENTE
BY
ATTORNEY

Dec. 13, 1960  B. FUENTE  2,964,058
HYDRAULIC VALVE WITH CONTROLLED BYPASS
TO REDUCE OPERATIONAL SENSITIVITY
Filed March 21, 1957                                        2 Sheets-Sheet 2

INVENTOR.
BENJAMIN FUENTE
BY
ATTORNEY

United States Patent Office 2,964,058
Patented Dec. 13, 1960

2,964,058

HYDRAULIC VALVE WITH CONTROLLED BY-PASS TO REDUCE OPERATIONAL SENSITIVITY

Benjamin Fuente, Cleveland, Ohio, assignor to Cleveland Pneumatic Industries, Inc., Cleveland, Ohio, a corporation of Ohio Filed Mar. 21, 1957, Ser. No. 647,544

1 Claim. (Cl. 137—622)

This invention relates generally to valves and more particularly to a new and improved hydraulic valve adapted for use in the control of fluid motors and the like.

In the control of fluid motors such as aircraft steering motors and the like difficulty is sometimes encountered because the valves are too sensitive. In other words, some valves produce substantial flow and pressure as soon as the valve starts to open which tends to cause the fluid motor to operate rapidly and with a jerk. When this occurs, the steering system becomes too sensitive and is difficult to control since very small control movements produce rapid steering action. In a valve according to this invention, means are provided to make the valve less sensitive to small control movement so that the control of the actuator will be smoother and softer.

It is an important object of this invention to provide a metering valve suitable for use for the control of hydraulic motors and actuators wherein metered pressure and flow through the valve is not extremely sensitive to valve movement.

It is another important object of this invention to provide a valve suitable for the use in controlling fluid flows wherein the rate of flow and controlled pressure builds up slowly as the valve is opened.

It is still another important object of this invention to provide a valve suitable for the use in the control of aircraft steering actuators which valve will provide smooth soft operation of the system.

It is still another important object of this invention to provide a flow control valve with a by-pass path which prevents the valve from being overly sensitive.

Further objects and advantages will appear from the following description and drawings wherein.

Figure 1:
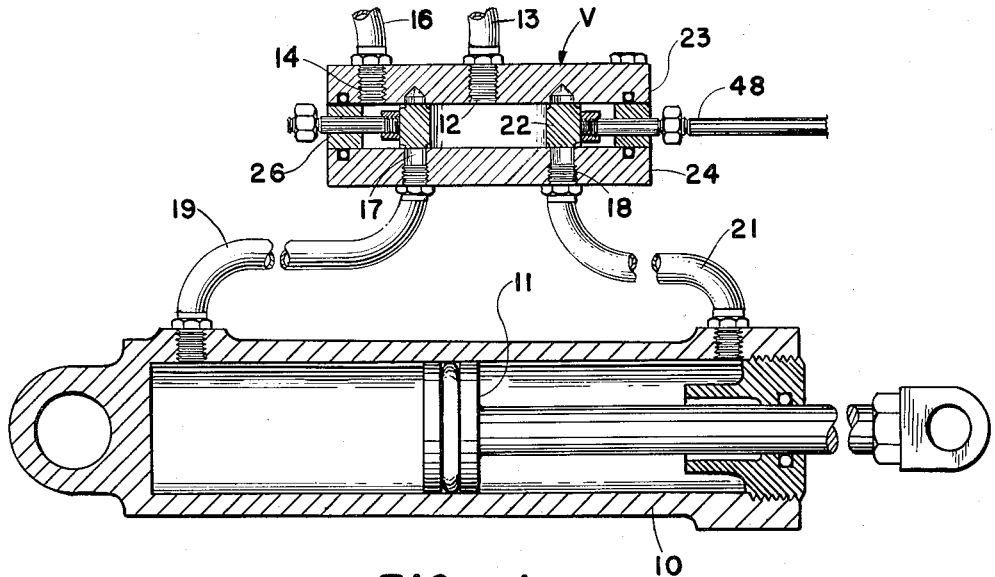
Figure 1 is a schematic illustration of a valve according to this invention as it would be used in connection with a conventional hydraulic motor.

Referring to the drawings, a valve V according to this invention is shown as it would be used in conjunction with a conventional fluid motor having a cylinder 10 and a piston 11. The valve V is provided with an inlet port 12 adapted to be connected to a source of fluid under pressure by a pressure line 13, and a reservoir return port 14 adapted to be connected to a fluid reservoir by a return line 16. Two controlled ports 17 and 18 are formed in the valve V and are connected to opposite ends of the cylinder 10 through pressure lines 19 and 21 respectively. A valve slide 22 is mounted within the valve body and operates to isolate the inlet port 12 from the controlled ports 17 and 18 when it is in the neutral or off position.

Movement of the valve slide 22 to the right brings the controlled port 18 into communication with the inlet port 12 while maintaining communication between the controlled port 17 and the reservoir return port 14. This, of course, provides fluid flow to the cylinder 10 which produces movement of the piston 11 to the left. The opposite movement of the valve slide 22 from the neutral position produces opposite connections and causes the piston 11 to move to the right. In both cases the rate of piston movement is a function of the rate of flow through the valve which is in turn a function of the valve slide displacement from the neutral position. Those skilled in the art will therefore recognize that a valve of the type disclosed can be used to control the operation of a fluid motor of any type and particularly a fluid motor suitable for use in steering mechanisms. The rate of movement of the motor will be a function of the amount of valve slide movement and the direction will be a function of the direction of valve slide movement.

Figure 2:
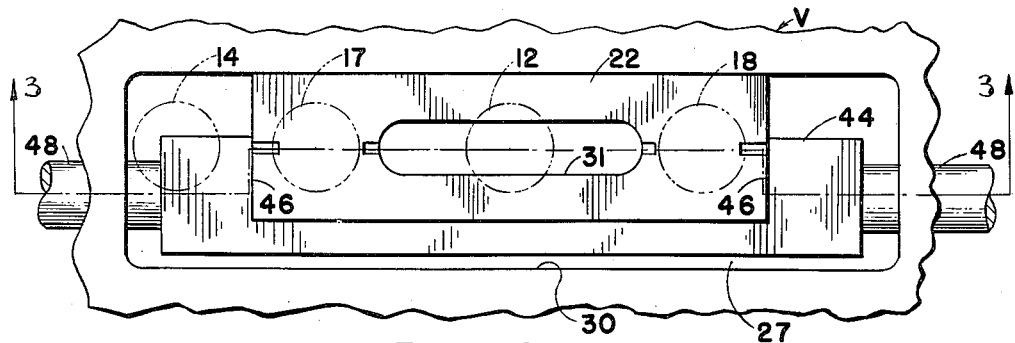
Figure 2 is a plan view of the valve structure with the upper cover plate removed.
Figure 3:
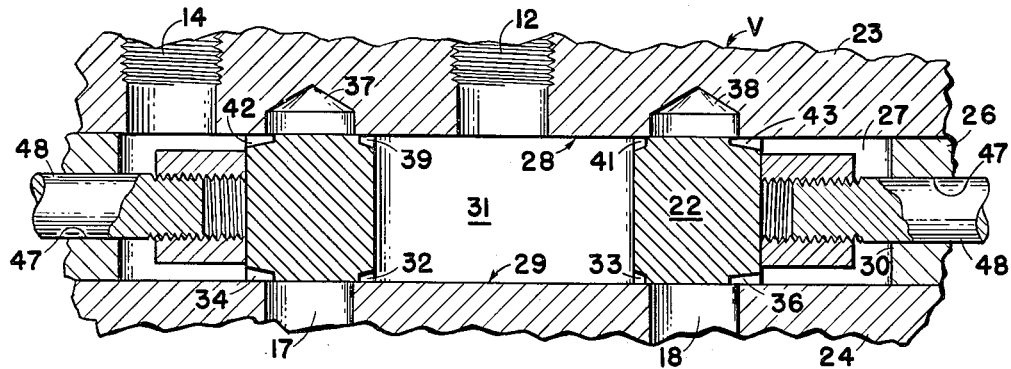
Figure 3 is a side elevation in longitudinal section showing the valve in the off or neutral position.

Referring to Figures 2 and 3, the valve body V is formed with a spacer plate 26 positioned between opposed side plates 23 and 24. The spacer plate 26 is formed with a rectangular opening 30 which is closed on its upper side by the upper side plate 23 and on its lower side by the lower side plate 24 so that the three elements cooperate to define a valve cavity 27. The two side plates 23 and 24 provide sealing surfaces 28 and 29 against which the valve slide 22 fits with a sealing engagement. The inlet port 12 and reservoir return port 14 are formed in the upper side plate 23 and open through the sealing surface 28 and the two controlled ports 17 and 18 are formed in the lower side plate 24 and open through the sealing surfaces 29. The valve slide 22 is formed with a central slot 31 which is open to the inlet port 12 so that fluid under pressure is always present therein and with notches 32 and 33 adjacent to the control ports 17 and 18 and open to the central slot 31. The ends of the notches 32 and 33 each terminate in a wall slightly spaced from the associated controlled ports when the valve slide 22 is in the neutral position shown in Figure 3. By-pass notches 34 and 36 are formed in the valve slide 22 open to the area of the valve cavity 27 around the valve slide and are in communication with the reservoir return port 14 at all times. The various elements are proportioned so that the by-pass notches 34 and 36 communicate with the corresponding controlled ports 17 and 18 when the valve slide is in the neutral position and in the initial operated positions on either side of the neutral position. Therefore, when the valve slide is in the neutral position fluid under pressure within the central slot 31 is isolated from the controlled ports 17 and 18 and the by-pass notches 34 and 36 provide communication between the controlled ports 17 and 18 and the reservoir return port 14.

Figure 5:
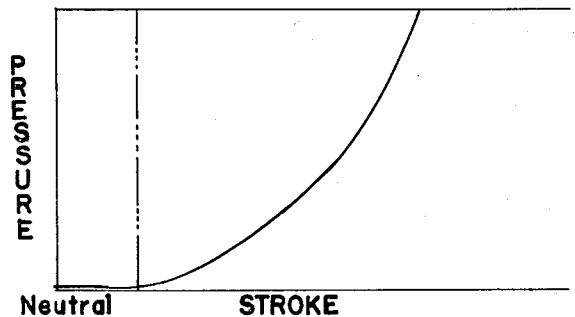
Figure 4:
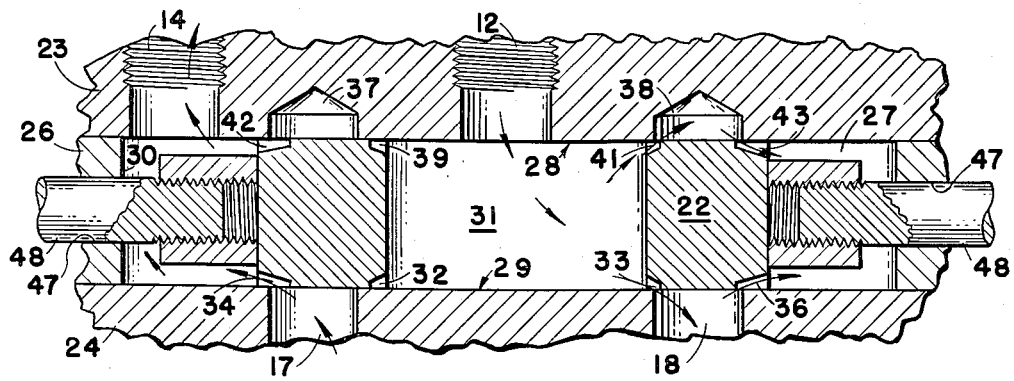
Figure 4 is a view similar to Figure 3 showing the valve in an open or operated position; and, Figure 5 is a pressure stroke curve of the preferred valve according to this invention.

Referring now to Figure 4, when the valve slide is moved from the neutral position to the right, the notch 33 moves into registry with the controlled port 18 to provide fluid communication between the inlet port 12 and the controlled port 18. This amount of movement, however, is small so the by-pass notch 36 still provides limited communication between the controlled port 18 and the reservoir return port 14. Because there is some flow out of the controlled port 18 through the by-pass notch 36 as the valve is initially opened, the resulting pressure within the controlled port 18 will be a function of the effective size of the notch 33 when compared to the effective size of the by-pass notch 36. This same movement of the valve slide 22 increases the effective area of the by-pass notch 34 so the communication between the controlled port 17 and reservoir return port 14 becomes less restricted. When the notch 33 first moves into registry with the controlled port 18 its effective area is small and the effective area of the by-pass notch 36 is relatively large so the effective flow into the controlled port 18 will be very small as the valve initially opens. By providing the by-passes in the valve it is possible to produce these small effective flows even though the notches are relatively large. If the by-passes were not provided it would be necessary to form the notches so small that they would be difficult to manufacture and be easily clogged. As the valve slide moves further from the neutral position the resistance to flow through the by-pass notches increases and the restriction to flow into the controlled port 18 is reduced. Therefore, the resistance to flow through the notch 33 is an inverse function of the displacement of the valve slide 22 from the neutral position and the resistance to flow through the by-pass notch 36 is a direct function of such displacement. The effective flow, of course, is the amount of flow into the controlled port 18 minus the flow out through the by-pass notch 36. Those skilled in the art will recognize that since the valve slide is symmetrical, movement of the valve slide in the opposite direction will produce the opposite fluid connections and that the by-pass notch 34 will function in the same manner to prevent a rapid increase of fluid flow into the controlled port 17. When the valve slide 22 is moved sufficiently the by-pass notch moves completely out of registry, the valve operates in the normal manner and the flow is determined only by the effective size of the notches 32 or 33 as the case may be. Figure 5 illustrates how the pressure build-up in the controlled ports is related to the valve movement. As the valve moves progressively from the neutral position, the pressure in the controlled port gradually increases until it approaches the inlet pressure. This gradual build-up enables the operator to smoothly control the fluid motor operation.

In order to assure that the valve slide is hydraulically balanced, the upper plate is provided with a blind bore 37 co-axial with the controlled port 17 and a second blind bore 38 opposite the controlled port 18. The two bores 37 and 38 are the same diameter as the corresponding controlled ports 17 and 18 so that they provide balancing areas opposite the controlled ports. The valve slide 22 is also provided with notches 39 and 41 on the upper surface thereof adjacent to the blind bores 37 and 38 which are identical to the corresponding notches 32 and 33. Also by-pass notches 42 and 43 which are similar to the by-pass notches 34 and 36 are formed in the valve slide 22 adjacent to the blind bores 37 and 38 respectively. This insures that the bores 37 and 38 have the same fluid connections as the corresponding controlled ports 17 and 18 so that the fluid pressure within the blind bores 37 and 38 will be substantially the same as the pressure in the corresponding controlled ports 17 and 18 and the valve slide 22 will be substantially balanced.

To provide for the operation of the valve slide 22 I utilize an actuating member 44 formed with opposed surfaces 46 which engage the ends of the valve slide so that the valve slide will be moved when the actuator member 44 is moved. The spacer plate 26 is formed with co-axial bores 47 through which project operating rods 48 which are threadedly connected to the actuator 44. The operating rods 48 extend to the exterior of the valve so that the valve may be operated by suitable mechanical means.

By utilizing a valve slide with by-pass provisions I am able to reduce the sensitivity of the valve in that a given valve movement will not produce as large an effective flow as would be produced if the by-pass were not used. Since the effective flow is related to the pressure within the controlled ports, the operation of the fluid motor will not be as sensitive to movement of the valve slide. Those skilled in the art will, therefore, recognize that a steering system utilizing a control valve according to this invention will have a smoother and softer action.

Although the preferred embodiment of this invention is illustrated it will be realized that various modifications of the structural details may be made without departing from the mode of operation in the essence of the invention. Therefore, except insofar as they are claimed in the appended claims, structural details may be varied widely without modifying the mode of operation. Accordingly, the appended claim and not the aforesaid detailed descriptions are determinative of the scope of the invention.

I claim:

A fluid valve comprising a body formed with a valve chamber defined in part by opposed parallel sealing surfaces, inlet and outlet ports open to said chamber, a pair of controlled ports open to said chamber through one of said surfaces, a blind bore open to said chamber through the other of said surfaces directly opposite each of said controlled ports, the opening of said blind bores having a cross-sectional area and shape identical to the opening of the associated controlled port, a valve member in said chamber engaging and sealing against both of said surfaces around said controlled ports and said bores movable between said first and second positions, inlet notches in said valve member adjacent to said controlled ports and bores communicating with said inlet port and isolated from said controlled ports and bores when said valve is in said first position and communicating with only one of said controlled ports and bores when in said second position, and bypass notches in said valve member in communication with said outlet port and with both of said controlled ports and bores in both said first and second positions the resistance to flow through said inlet notches decreasing as said valve member moves toward said second position and the resistance to flow through said by-pass increasing as said valve member moves toward said second position.

References Cited in the file of this patent

UNITED STATES PATENTS

| 2,200,396 | Martin | May 14, 1940 |
| 2,212,955 | Price et al. | Aug. 27, 1940 |
| 2,380,705 | Proctor | July 31, 1945 |
| 2,603,192 | Kensok | July 15, 1952 |
| 2,702,529 | Doerfner | Feb. 22, 1955 |
| 2,706,467 | Houldsworth | Apr. 19, 1955 |
| 2,796,851 | Ziskal | June 25, 1957 |
| 2,868,227 | Stephens | Jan. 13, 1959 |

FOREIGN PATENTS

| 231,630 | Switzerland | Jan. 12, 1943 |